(12) United States Patent
Ritter (10) Patent No.: US 6,922,193 B2
(45) Date of Patent: Jul. 26, 2005

(54) METHOD FOR EFFICIENTLY CALCULATING TEXTURE COORDINATE GRADIENT VECTORS

(75) Inventor: Bradford A. Ritter, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 09/921,680

(22) Filed: Aug. 3, 2001

(65) Prior Publication Data

US 2002/0030681 A1 Mar. 14, 2002

Related U.S. Application Data

(63) Continuation-in-part of application No. 09/573,059, filed on May 17, 2000.

(51) Int. Cl.[7] ............................................... G06T 15/60
(52) U.S. Cl. ....................... 345/426; 345/584; 345/586; 345/582; 345/589
(58) Field of Search ................................. 345/426, 586, 345/589, 582, 584

(56) References Cited

U.S. PATENT DOCUMENTS 5,710,876 A * 1/1998 Peercy et al. ................ 345/426
6,163,319 A * 12/2000 Peercy et al. ................ 345/426
6,583,790 B1 * 6/2003 Wolters ....................... 345/584

OTHER PUBLICATIONS

U.S. Appl. No. 09/528,700, Apparatus for and Method of Rendering 3D Objects with Parametric Texture Maps.
U.S. Appl. No. 09/573,059, Method and Apparatus for Performing H–Space Bump Mapping Suitable for Implementation with H–Space Lighting in a Graphics Pipeline of a Computer Graphics Display System, filed May 17, 2000.
U.S. Appl. No. 09/921,681, System and Method for Rendering Digital Images Having Surface Reflectance Properties, filed Aug. 3, 2001.

* cited by examiner

*Primary Examiner*—Kimbinh T. Nguyen (57) ABSTRACT

One embodiment of the present invention provides a method for rendering a three-dimensional 3D graphical image. The method comprises representing the 3D graphical image as a plurality of graphics primitives, each having a plurality of vertices. For each of said plurality of graphics primitives, at least two texture coordinate gradient vectors are computed. Additionally, for each vertex of the plurality of graphics primitives, the method comprises determining a 3D coordinate frame, wherein such determining step includes using the at least two texture coordinate gradient vectors computed for the respective graphics primitive for orienting the 3D coordinate frame. Thereafter, the method comprises utilizing at least the 3D coordinate frame to determine parameters of a parametric texture mapping function.

36 Claims, 2 Drawing Sheets

LEGEND:
N = NORMAL
B = BINORMAL
T = TANGENT

FIG. 4

LEGEND:
N = NORMAL
B = BINORMAL
T = TANGENT

METHOD FOR EFFICIENTLY CALCULATING TEXTURE COORDINATE GRADIENT VECTORS

CROSS-REFERENCE TO RELATED APPLICATIONS

This is a continuation-in-part of co-pending and commonly assigned patent application Ser. No. 09/573,059 filed May 17, 2000, entitled "METHOD AND APPARATUS FOR PERFORMING H-SPACE BUMP MAPPING SUITABLE FOR IMPLEMENTATION WITH H-SPACE LIGHTING IN A GRAPHICS PIPELINE OF A COMPUTER GRAPHICS DISPLAY SYSTEM," the disclosure of which is hereby incorporated herein by reference. The present invention is also related to co-pending and commonly assigned U.S. patent application Ser. No. 09/528,700 filed Mar. 17, 2000, entitled "APPARATUS FOR AND METHOD OF RENDERING 3D OBJECTS WITH PARAMETRIC TEXTURE MAPS," and concurrently filed and commonly assigned U.S. patent application Ser. No. 09/921,681, entitled "SYSTEM AND METHOD FOR RENDERING DIGITAL IMAGES HAVING SURFACE REFLECTANCE PROPERTIES," the disclosure of which are hereby incorporated herein by reference.

TECHNICAL FIELD OF THE INVENTION

The present invention generally relates to computer graphics display systems and, more particularly, to a system and method for efficiently calculating texture coordinate gradient vectors for use in rendering graphical images.

BACKGROUND OF THE INVENTION

Computer graphics display systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics system and a graphics display screen. More specifically, conventional computer graphics systems commonly include a display device having a two-dimensional (2D) array of light emitting areas. The light emitting areas are usually referred to as "pixels," which is an abbreviation for picture elements. Such a graphics system typically employs hardware, software, or both to generate a 2D array of values that determine the colors or shades of grey that are to be emitted from the corresponding pixels of the display.

Computer graphics systems are commonly employed for the display of three-dimensional (3D) objects. Typically, such a system generates what appears to be a 3D object on a 2D display by generating 2D views of the 3D object that is modeled in the computer memory. The 2D view of a 3D object which is generated at a particular time usually depends at least on a spatial relationship between the 3D object and a viewer of the 3D object at the particular time. This spatial relationship may be referred to as the view or eye point direction. For example, a car is a 3D object having a front and a back. However, whether one can see the taillights will depend on the position from which one is viewing the car. A view direction that is directly in front of the car will not show the taillights (but may instead show the headlights), while a view direction that is directly behind the car will show the taillights.

The process by which a computer graphics system generates the values for a 2D view of a 3D object is commonly referred to as image rendering or scan conversion. In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are generated in terms of primitive data by software being executed by the host CPU. For example, when the primitive is a triangle, the software being executed by the host computer defines the primitive in terms of the X, Y and Z coordinates of its vertices, the normals of the vertices, $N_x$, $N_y$ and $N_z$, and the red, green, blue and alpha (R, G, B and α) color values of each vertex. Alpha is a transparency value. Additional primitive data may be used in specific applications. Rendering hardware interpolates all of this data to compute the display screen pixels that represent each primitive, and the R, G, B and a values for each pixel.

Thus, conventional graphics systems usually render a 3D object by subdividing the 3D object into a set of polygons and rendering each of the polygons individually. The values for a polygon that are rendered for a particular view direction usually depend on the surface features of the polygon and the effects of the lighting on the polygon. The surface features often include details such as surface colors and surface structures. The effects of lighting usually depend on a spatial relationship between the polygon and one or more light sources. This spatial relationship may be referred to as the light source direction. For example, if there is only one light source, the side of the object closest to the light source will be illuminated while the side of the object furthest from the light source might be in shadow.

Typically, the evaluation of the effects of lighting on an individual pixel in a polygon for a particular view direction involves a number of 3D vector calculations. One of ordinary skill in the art will recognize that the standard Blinn/Phong lighting equation is commonly used in computer graphics for performing lighting calculations for graphical images. Lighting calculations based on the Blinn/Phong equation generally includes floating-point, square-root and divide operations when used with normalized vectors. Such calculations are usually time consuming and expensive whether performed in hardware or software.

One conventional method for reducing such computational overhead is to evaluate the effects of lighting at just a few areas of a polygon, such as the vertices, and then to interpolate the results across the entire polygon. Examples include methods which are commonly referred to as flat shading and Gouraud shading. Such methods usually reduce the number of calculations that are performed during scan conversion and thereby increase rendering speed. Unfortunately, such methods also usually fail to render shading features that are smaller than the areas of individual polygons. If the polygons are relatively large, the view will be noticeably distorted.

One conventional method for rendering features that are smaller than the area of a polygon is to employ what is referred to as a texture map. In general, a texture refers to a graphics data structure which models the surface appearance of an object. A texture may represent the visual experience of many materials and substances (e.g., terrain, plants, minerals, fur, and skin). Textures may be created digitally by sampling a physical surface utilizing photographic techniques. Alternatively, textures may be created manually utilizing a suitable graphics design application. Texture mapping involves mapping the surface appearance to a graphical surface modeled by a 3D structure. A typical texture map is a table that contains a pattern of color values for a particular surface feature. For example, a wood grain surface feature may be rendered using the surface and a texture map that holds a color pattern for wood grain.

Texture mapping may be utilized for any number of applications. For example, texture mapping may be utilized by an architectural software application to generate a realistic depiction of a building based upon blueprint designs. For instance, a stucco texture may be wrapped onto a building frame by the architectural software application. Texture mapping may be additionally used to create special effects for movies, video game animation, website wallpapers, and/or the like. Texture mapping is desirable for these applications because it facilitates the representation of an object with an appreciable amount of realism and detail. Moreover, texture mapping may impart 3D qualities to the computer generated image.

Figures 1A, 1B:
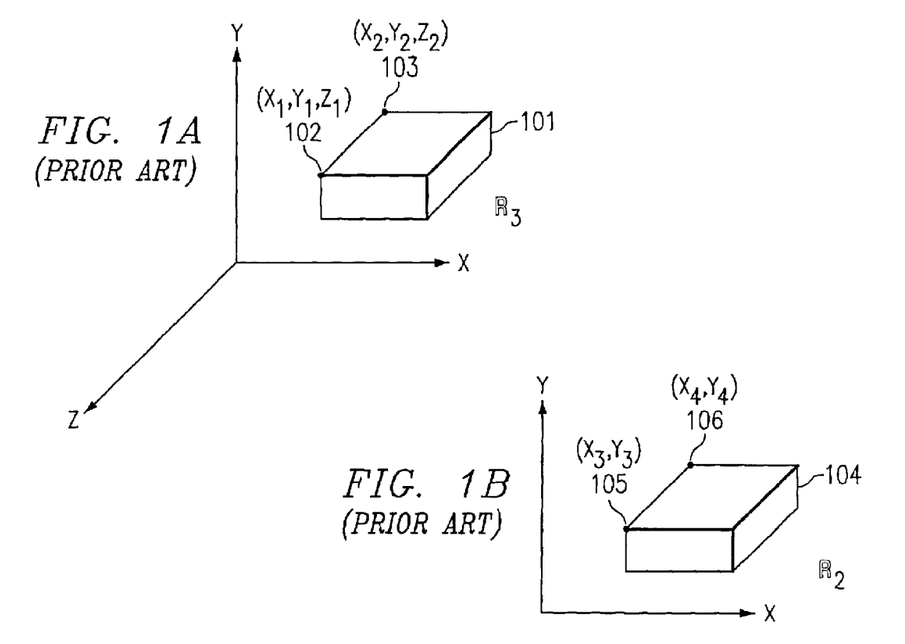
FIG. 1A depicts an exemplary object in $R_3$ according to the prior art.
FIG. 1B depicts an exemplary mapping of polygons into $R_2$ based on the object depicted in FIG. 1A according to the prior art.

Texture mapping algorithms involve wrapping a texture over the surface of a model. Specifically, a 3D model or data structure of an object is created. For example, FIG. 1A depicts exemplary object 101 in $R_3$ (i.e., 3D real space). The surface of object 101 may be represented as a set of polygons (typically triangles) in 3D space. The polygons are represented by their various vertexes. The vertexes are defined by coordinates in $R_3$. For example, vertex 102 is defined by $(X_1, Y_1, Z_1)$ and vertex 103 is defined by $(X_2, Y_2, Z_2)$.

As described above, most computer displays are only capable of displaying a 2D view of such 3D object 101. Accordingly, a mapping function is utilized to map the coordinates in $R_3$ to coordinates in $R_2$ (i.e., 2D real space). Typically, the mapping occurs by defining a view angle. FIG. 1B depicts such a mapping from object 101 to object 104. Vertex 102 is mapped to vertex 105 where vertex 105 is defined by two coordinates $(X_3, Y_3)$. Likewise, vertex 103 is mapped to vertex 106 where vertex 106 is defined by two coordinates $(X_4, Y_4)$. The mapping function allows the data to be represented in a form that may be displayed by a computer display.

Figure 2:
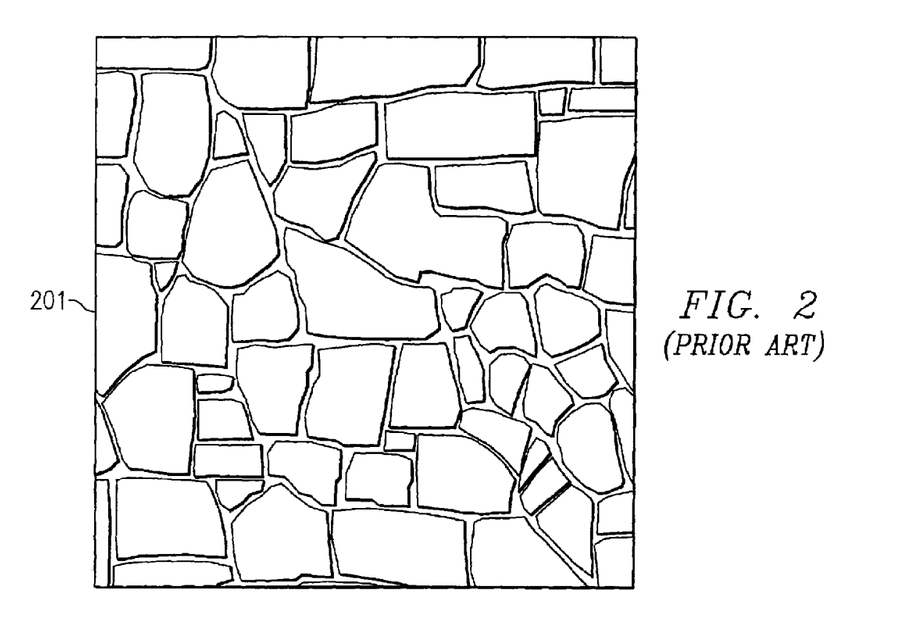
FIG. 2 depicts an exemplary texture according to the prior art.

Concurrently with the mapping, a texture is applied within the confines of the polygons of object 104 to provide a realistic appearance. For example, texture 201 of FIG. 2 may be applied to the polygons of object 104 to create a stone-like appearance. Texture 201 is typically implemented as a matrix of red-green-blue (RGB) values. The RGB values are mapped utilizing a suitable mapping function to the interior of the polygons of object 104. The final graphical image appears to have texture 201 "wrapped" around object 104.

However, this approach is limited as the final graphical image, to an extent, appears flat. Specifically, the graphical image does not appreciably vary in response to a change in illumination direction. Since it does not appreciably change under these conditions, localized shading or occlusions are not evident. Moreover, interreflections due to surface irregularities are not perceived.

Bump mapping is one texture mapping technique that addresses these limitations. Bump mapping involves creating a bump map of displacement values. The displacement values are utilized to perturb the surface normal vector. The perturbed surface normal vector is utilized to render shading in accordance with the Blinn/Phong lighting equation.

As is well known in the art, texture mapping techniques generally utilize a coordinate system for mapping a texture onto a 3D graphical object. For instance, in rendering a texture represented as polygons (e.g., triangles), a texture mapping technique may use a 3D coordinate system formed by the surface normal vector, tangent vector, and binormal vector for each vertex. Further, as is well known in the art, texture coordinate gradient vectors are commonly computed for orienting the texture within the coordinate system of the texture mapping technique. Thus, in rendering the texture, a texture mapping technique, such as a bump mapping technique, may compute texture coordinate gradient vectors for each polygon (e.g., triangle) that forms the texture being rendered in order to properly orient the texture within the texture mapping's coordinate system. It should be appreciated that the 3D object onto which the texture is being mapped may comprise many polygons. Because the texture coordinate gradient vectors are computed for each of the polygons, much computation may be associated with the computation of such coordinate gradient vectors. Therefore, it is desirable to provide a method for efficiently computing coordinate gradient vectors in order to optimize the efficiency of the rendering process.

BRIEF SUMMARY OF THE INVENTION

One embodiment of the present invention provides a method for rendering a three-dimensional (3D) graphical image. The method comprises representing the 3D graphical image as a plurality of graphics primitives, each having a plurality of vertices. For each of said plurality of graphics primitives each having a plurality of vertices, at least two texture coordinate gradient vectors are computed. Additionally, for each vertex of the plurality of graphics primitives, the method comprises determining a 3D coordinate frame, wherein such determining step includes using the at least two texture coordinate gradient vectors computed for the respective graphics primitive for orienting the 3D coordinate frame. Thereafter, the method comprises utilizing at least the 3D coordinate frame to determine parameters of a parametric texture mapping function.

DETAILED DESCRIPTION OF THE INVENTION

In general, texture mapping has gained much appreciation because of the computational efficiency of many texture mapping techniques in rendering graphical images. That is, many texture mapping techniques are computationally more efficient than non-texture mapping techniques for rendering graphical images, such as very complex geometry techniques (e.g., using very many tiny triangles) and radiosity (ray-traced lighting algorithms). Thus, because of their computational efficiency, texture mapping techniques may enable graphical images to be rendered much more quickly than non-texture mapping techniques. As described above, bump mapping is one texture mapping technique. More recently, another technique, known as parametric texture mapping ("PTM"), has been developed for performing texture mapping in a manner that renders greater realism than the bump mapping technique.

In general, PTM is a computer algorithm for rendering objects using a two-dimensional representation of light. PTM is often desirable because it produces quite realistic images based on material properties while employing reasonable computational complexity. Additionally, it shall be appreciated that the PTM algorithm is capable of producing appreciably greater realism for graphical images than many other graphical rendering techniques, such as those employing RGB encoding techniques and bump mapping.

In texture maps, such as a PTM, a texture may be represented as a matrix of discrete components called "texels," which refer to texture elements. Texels may be understood as being analogous to pixels. In a traditional RGB texture, a texel is an RGB component. In PTM, texels generally are more complex data structures which contain lighting information. In a luminance PTM (which is described further below), the data associated with a texel generally comprises six coefficients and an RGB component. In a RGB PTM (which is described further below), the data associated with a texel generally comprises 6 coefficients for each color channel (R, G, B), resulting in a total of 18 coefficients for a texel. The lighting information included in PTMs may be used to reconstruct the surface color under varying light conditions. By encoding lighting information in this manner, PTM textures may permit perception of surface deformations. Additionally, PTM textures may permit perception of self-shadowing and interreflections. PTM textures may also simulate other optical effects such as anisotropic and Frensel shading models.

Generally, in PTM, each texel is defined by a biquadric function with six coefficients. The texels are represented by the following form:

$$PTM(u,v)=Au^2+Bv^2+Cuv+Du+Ev+F,$$

where u and v represent scalar quantities associated with orthogonal components of a vector in a plane. For example, u and v may represent the intensity of light from two different directions where the texel is rendered on a three-dimensional object or model. Specifically, a light source is first determined to be illuminating the texture which, for example, may be wrapped on the three-dimensional object. The light source is defined as being positioned at a location relative to the texel being illuminated in the direction defined by illumination vector, L. Illumination vector, L, is typically a unit vector. Secondly, surface normal vector, S, is determined (which is also typically a unit vector). The projection of illumination vector, L, onto the plane defined by surface normal vector, S, is determined. The projection may be represented as two orthogonal vector components on the plane defined by surface normal vector, S. The two orthogonal vector components are respectively associated with the scalar values, u and v. Thus, the projection of illumination vector L onto the plane defined by surface normal vector S comprises components $l_u$ and $l_v$.

The coefficients of the texel representation equation, A–F, of the PTM texture function described above may be determined by repeatedly sampling a surface. For example, a physical stone surface may be digitally photographed a number of times utilizing different illumination angles. The coefficients, A–F, may then be determined from the digital information utilizing a least square approximation. Singular value decomposition (SVD) may be utilized to perform this analysis. Further details regarding implementation of PTM algorithms are disclosed in U.S. patent application Ser. No. 09/528,700, entitled "APPARATUS FOR AND METHOD OF RENDERING 3D OBJECTS WITH PARAMETRIC TEXTURE MAPS."

In certain implementations, the preceding PTM function may define the brightness of a texel, while the chromaticity remains constant. It shall be appreciated, however, that in other implementations separate functions may be defined for red, green, and blue (RGB) chromatic components or channels. The separate functions may be used to calculate gray-level intensities of the RGB channels. According to such an approach, three separate functions are each evaluated according to u and v as determined by the same surface normal vector, S, and the same illumination vector, L. Generally, it is advantageous to cause the chromaticity to remain independent of u and v, because this approach reduces the computational complexity of the algorithm.

Although PTM textures were primarily developed for three-dimensional texture mapping applications, PTM textures are not limited to three-dimensional applications. For example, PTM textures may be utilized to perform image enhancement. PTM textures may also be utilized to interactively control lighting conditions to promote increased perception of surface characteristics. As one example, PTM may be utilized to provide an efficient method for rendering graphical objects with surface reflectance properties (e.g., PTM may be implemented for modeling a Bidirectional Reflectance Distribution Function), such as disclosed in concurrently filed and commonly assigned U.S. patent application Ser. No. 09/921,571, entitled "SYSTEM AND METHOD FOR RENDERING DIGITAL IMAGES HAVING SURFACE REFLECTANCE PROPERTIES." In certain embodiments of the present invention, PTMs may be implemented having four (or more) independent variables, and the PTMs may be parameterized in different ways depending on the independent variables implemented therein. For instance, in certain embodiments PTMs may include four independent variables with two independent variables used for indexing the PTM and the other two independent variables used to evaluate the PTM function. For example, a PTM may be parameterized using independent variables for representing light direction (e.g., $l_u$ and $l_v$) and independent variables for representing surface position (e.g., with texture coordinates s and t). The surface position may be used to index the texture, e.g., using texture coordinates (s, t). An example of such a PTM may take the form:

$$PTM(s,t,l_u,l_v)=A(s,t)l_u^2+B(s,t)l_v^2+C(s,t)l_ul_v+D(s,t)l_u+E(s,t)l_v+F(s,t).$$

As with the variables u and v described above, $l_u$ and $l_v$ represent scalar quantities associated with orthogonal components of a vector. For example, $l_u$ and $l_v$ may represent the intensity of light from two different directions where the texel is rendered on the three-dimensional object, as described above. And, s and t represent texture coordinates that identify a position on the texture. Independent variables $l_u$ and $l_v$ for representing the light direction may be determined as follows: $l_u$=Dot(light, tangent) and $l_v$=Dot(light, binormal). Thus, independent variable $l_u$ is the dot product of the light and tangent vectors, while variable $l_v$ is the dot product of the light and binormal vectors.

As another example, a PTM may be parameterized using independent variables for representing light direction (e.g., $l_u$ and $l_v$) and independent variables for representing view direction (e.g., $v_u$ and $v_v$). That is, a view vector V may be defined, which when projected into the plane defined by surface normal vector S comprises components $v_u$ and $v_v$. In such case, independent variables for representing the light direction, $l_u$ and $l_v$, may be determined in the manner described above, wherein: $l_u$=Dot(light, tangent) and $l_v$=Dot(light, binormal). Further, independent variables for representing the view direction, $v_u$ and $v_v$, may be determined as follows: $v_u$=Dot(view, tangent) and $v_v$=Dot(view, binormal). Thus, independent variable $v_u$ is the dot product of the view and tangent vectors, while variable $v_v$ is the dot product of the view and binormal vectors. One of the (u, v) pair may be used to index the texture, while the other (u, v) pair may be used to evaluate the PTM function, f(u, v).

As still another example, a PTM may be parameterized using independent variables for representing a half-angle vector (e.g., $h_u$ and $h_v$) and independent variables for representing a difference vector (e.g., $d_u$ and $d_v$). In general, a half-angle vector H is halfway between the view and light vectors, and is defined as: H=|L+V|. The difference vector D is such that L=H+D and V+H−D. When projected into the plane defined by surface normal vector S, Half-angle vector H comprises components $h_u$ and $h_v$ and difference vector D comprises components $d_u$ and $d_v$.

In such case, independent variables for representing the half-angle vector, $h_u$ and $h_v$, may be determined as follows: $h_u$=Dot(half-angle, tangent) and $h_v$=Dot(half-angle, binormal). Further, independent variables for representing the difference vector, $D_u$ and $D_v$, may be determined. As described above, the difference vector (D) is such that: L=H+D and V=H−D. Thus, $D_u$ is the u component of the projection of the difference vector (D) into the plane defined by the normal vector (S), and $D_v$ is the v component of the projection of the difference vector (D) into the plane defined by the normal vector (S). The (Hu, Hv) pair may be used to index the texture, while the (Du, Dv) pair may be used to evaluate the PTM function, f(u, v).

Embodiments of the present invention utilize PTMs for rendering graphical images (e.g., for rendering textures). As with traditional texture mapping techniques, such as bump mapping, PTM techniques generally utilize a coordinate system for mapping a texture onto a 3D graphical object. For instance, in rendering a texture onto a 3D graphical object represented as polygons (e.g., triangles), the PTM texture mapping technique generally uses a coordinate system formed by the surface normal vector, tangent vector, and binormal vector for each vertex of the polygons. Further, as with traditional texture mapping techniques, such as bump mapping, texture coordinate gradient vectors are generally computed for orienting the texture within the coordinate system of the PTM. Thus, in rendering the texture, the PTM generally computes texture coordinate gradient vectors for each of the polygons (e.g., triangles) that form the texture being rendered in order to properly orient the texture within the PTM's coordinate system. After calculating the texture coordinate gradient vectors for a polygon, a 3D coordinate frame (e.g., comprising surface normal vector, tangent vector, and binormal vector) is generally calculated for each vertex of the polygon. The texture coordinate gradient vectors computed for a polygon are used to orient the 3D coordinate frame for each vertex of the polygon. The process of rendering a graphical image using a PTM in accordance with embodiments of the present invention is further described below.

In general, the process of rendering a texture using a PTM comprises the following steps:

Step 1: Calculate texture coordinate gradient vectors for each graphics primitive (e.g., each polygon, triangle, etc.) of the texture. The calculation of such texture coordinate gradient vectors in accordance with embodiments of the present invention is further described herein below.

Step 2: Determine a 3D coordinate frame for each vertex of the graphics primitives. For example, such 3D coordinate frame is generally formed by a surface normal vector, tangent vector, and binormal vector. It should be understood that the texture coordinate gradient vectors are utilized in properly orienting the 3D coordinate frame for each vertex.

Step 3: Calculate ($l_u$, $l_v$) per vertex of the graphics primitives:

$l_u$=Dot(light, tangent); and $l_v$=Dot(light, binormal)

Step 4: Interpolate ($l_u$, $l_v$) for each pixel in the interior of the graphics primitives, and interpolate (s, t) texture coordinates for each pixel in the interior of the graphics primitives.

Step 5: For each pixel, use interpolated (s, t) texture coordinates to look up biquadric polynomial coefficients from the PTM texture (A,B,C,D,E,F), and use interpolated ($l_u$, $l_v$) values to evaluate the PTM's biquadric polynomial(s). Generally, PTM functions may be defined as either RGB PTMs or Luminance PTMs. With RGB PTMs, separate functions are defined for red, green, and blue (RGB) chromatic components or channels. That is, there is a unique biquadric polynomial for each of the three color channels, such as:

$$R = A_R l_u^2 + B_R l_v^2 + C_R l_u l_v + D_R l_u + E_R l_v + F_R$$

$$G = A_G l_u^2 + B_G l_v^2 + C_G l_u l_v + D_G l_u + E_G l_v + F_G$$

$$B = A_B l_u^2 + B_B l_v^2 + C_B l_u l_v + D_B l_u + E_B l_v + F_B,$$

wherein a separate function is provided for defining the red (R), green (G), and blue (B) color channels. The separate functions may be used to calculate gray-level intensities of the RGB channels. According to this approach, three separate functions are each evaluated according to $l_u$ and $l_v$.

In luminance PTMs, a PTM function is provided that defines the brightness of a texel, while the chromaticity remains constant. That is, for luminance PTMs one biquadric polynomial is provided that determines a luminance value, which may then be applied to the RGB color channels, such as:

$$\text{Luminance} = A(l_u^2) + B(l_v^2) + C(l_u l_v) + D(l_u) + E(l_v) + F$$

$$R' = R \times \text{Luminance}$$

$$G' = G \times \text{Luminance}$$

$$B' = B \times \text{Luminance}$$

wherein the Luminance value is applied to red (R), green (G), and blue (B) color channels to render realistic color channels R', G', and B' to be used in rendering the graphical image. It may be advantageous to cause the chromaticity to remain independent of u and v, as with luminance PTMs, because this approach reduces the computational complexity of the algorithm.

The above provides an exemplary process for rendering a graphical object (e.g., texture) using a PTM. It should be appreciated that the graphical object (e.g., texture) may comprise many polygons, and the texture coordinate gradient vectors are computed for each of the polygons, which may result in much of the computation associated with the rendering process being computation of such texture coordinate gradient vectors. Therefore, embodiments of the present invention provide a method for efficiently computing such texture coordinate gradient vectors, which are preferably utilized to further enhance the efficiency of PTMs in rendering graphical images (e.g., in rendering textures).

Figure 3:
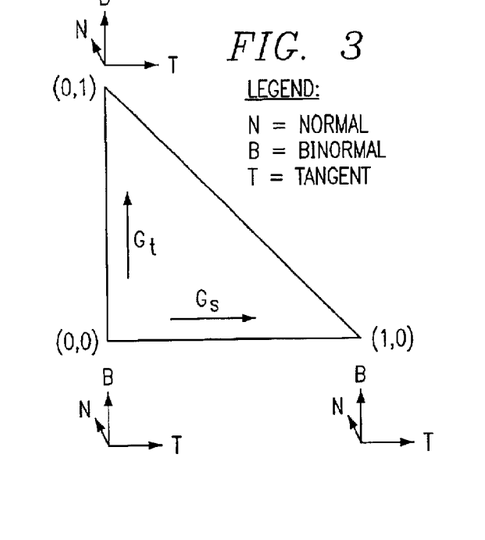
FIG. 3 provides a simple example of a triangle that may be used in displaying a texture (or other graphics object), which illustrates texture coordinate gradient vectors for such triangle.
Figure 4:
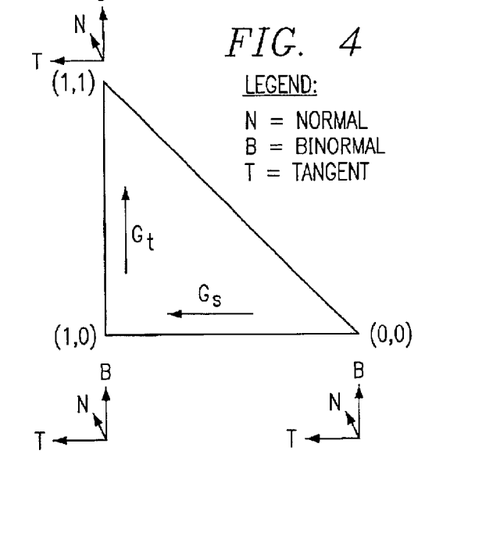
FIG. 4 provides another simple example of a triangle that may be used in displaying a texture (or other graphics object), which illustrates texture coordinate gradient vectors for such triangle.

While those of ordinary skill in the art will be familiar with the use of texture coordinate gradient vectors in computer graphics rendering (e.g., in texture mapping), a relatively simple example of utilizing texture coordinate gradient vectors in accordance with embodiments of the present invention is provided in FIGS. 3 and 4. FIGS. 3 and 4 each provide a very simple example of a triangle that may be used in displaying a texture (or other graphics object). It should be understood that the triangles of FIGS. 3 and 4 are actually represented in 3D in practice, but expressed in FIGS. 3 and 4 in the 2D representation of the texture (i.e., in accordance with the texture coordinate system defined by S and T. The 2D texture coordinates (s, t) for the vertices of the triangles are shown in FIGS. 3 and 4. For example, the triangle of FIG. 3 has vertices at texture coordinates (0,0), (1,0), and (0,1), and the triangle of FIG. 4 has vertices at texture coordinates (1,0), (0,0), and (1,1).

As described above, in the PTM process, a 3D coordinate frame is determined for each vertex of the triangle. More specifically, a 3D coordinate frame formed by a surface normal vector, tangent vector, and binormal vector is generally determined for each vertex. In the relatively simple examples of FIGS. 3 and 4, the normal vectors are all pointed directly up from the page. This is a simplification, as in practice the normal vectors for a triangle do not usually all point in the same direction. Generally, the rendering process (e.g., the PTM rendering process) is provided the texture coordinates (s, t) and normal vectors for the vertices of a triangle. The rendering process then calculates the tangent and binormal vectors for each vertex. As described above and as is illustrated in the examples of FIGS. 3 and 4, the normal, tangent, and binormal vectors are each perpendicular to one another and form a 3D coordinate frame.

In determining such 3D coordinate frame, the computed texture coordinate gradient vectors for a triangle are used to properly orient the 3D coordinate frame for each vertex of the triangle. In embodiments of the present invention, two gradient vectors are computed for each triangle of a graphical object. One gradient vector ("$G_s$") is computed which identifies the direction of "maximum change" in the s texture coordinate, and the other gradient vector ("$G_t$") is computed which identifies the direction of "maximum change" in the t texture coordinate. In this sense, the direction of "maximum change" refers to the direction in which a component of the texture coordinate (i.e., s or t) changes the fastest. For instance, in the example of FIG. 3, gradient vector $G_s$ is determined as being directed along texture coordinate s in the direction from texture coordinate (0,0) to texture coordinate (1,0). Similarly, gradient vector $G_t$ is determined as being directed along texture coordinate t in the direction from texture coordinate (0,0) to texture coordinate (0,1). The determined texture coordinate gradient vectors for the triangle shown in FIG. 4 are illustrated therein.

The computed texture coordinate gradient vectors ($G_s$ and $G_t$) for a triangle are used by the rendering process to properly determine the orientation of the 3D coordinate frame for each vertex of the triangle. In embodiments of the present invention, the tangent vector is determined to be perpendicular to the normal vector, and it is determined to be directed in the general direction of the s texture coordinate gradient vector ($G_s$). Similarly, the binormal is perpendicular to both the normal and tangent vectors, and it is determined to be directed in the general direction of the t texture coordinate gradient vector ($G_t$).

The difference between the examples shown in FIGS. 3 and 4 is in the assignment of the texture coordinates for each triangle. In the example of FIG. 3, the texture coordinates are assigned in a traditional left-to-right and bottom-to-top manner. In other words, the s texture coordinates increase in value from left to right, and the t texture coordinates increase in value from bottom to top. FIG. 4 has texture coordinates assigned such that the texture is flipped from left to right. That is, the s texture coordinates increase in value from right to left.

Because of the change in orientation of the triangle in FIG. 4 from that of FIG. 3, the texture coordinate gradient vectors $G_s$ and $G_t$ are different in FIG. 4. The first effect of such a change is that the calculation of the tangent vector changes for the vertices of the triangle of FIG. 4. It should be noted that the tangent vector for each vertex in FIG. 4 has changed from the tangent vector determined for each vertex in the example of FIG. 3. It should be recognized that the orientation along the t texture coordinate has not changed from FIG. 3 to FIG. 4, and therefore the binormal vector remains the same for each vertex. Of course, if the orientation of the triangle in FIG. 4 had a different orientation along the t texture coordinate, the binormal vector would change.

Because of the change in the tangent vector in FIG. 4 from that of FIG. 3, the calculation of $l_u$ changes (it should be recalled that $l_u$ is the dot product of the light vector and tangent vector). Of course, if a change occurred with the binormal vector, the calculation of $l_v$ would change, as $l_v$ is the dot product of the light vector and the binormal vector. As a result of the change in $l_u$, the evaluation of the PTM's biquadric polynomial(s) changes such that features of the PTM that are oriented to the right in FIG. 3 are oriented to the left in FIG. 4.

It should be understood that the examples provided in FIGS. 3 and 4 are very simplified. In practice, vertex normal vectors for a triangle do not generally all point in the same direction. Further, the triangles are generally represented in 3D, and the resulting texture coordinate gradient vectors $G_s$ and $G_t$ are also generally calculated in 3D. Further, the resulting tangent and binormal vectors are also generally calculated in 3D.

As described above, texture coordinate gradient vectors are generally computed for each graphics primitive (e.g., triangle) of a graphical object to be rendered using PTM. For instance, texture coordinate gradient vectors are generally computed for each graphics primitive of a 3D object onto which a texture is being mapped. Because a graphical object may include many such graphics primitives and texture coordinate gradient vectors are computed for each of such graphics primitives, embodiments of the present invention utilize an efficient method for computing the texture coordinate gradient vectors to further improve the rendering efficiency of a PTM. A method for efficiently computing texture coordinate gradient vectors is disclosed in co-pending and commonly assigned patent application Ser. No. 09/573,059, entitled "METHOD AND APPARATUS FOR PERFORMING H-SPACE BUMP MAPPING SUIT- ABLE FOR IMPLEMENTATION WITH H-SPACE LIGHTING IN A GRAPHICS PIPELINE OF A COMPUTER GRAPHICS DISPLAY SYSTEM," from which this application is a continuation-in-part. In accordance with various embodiments of the present invention, such method for efficiently computing texture coordinate gradient vectors is utilized for computing texture coordinate gradient vectors for use with PTMs (as well as other texture mapping techniques in which the resulting texture varies responsive to its orientation relative to a light vector) for rendering graphical objects. Accordingly, the method for efficiently computing texture coordinate gradient vectors is further reiterated herein below.

In the below description, the variables (s, t) are texture coordinates for a given triangle vertex. The texture coordinate gradient vector, $G_s$, associated with the s texture coordinate is defined as the vector: $\{ds/dX, ds/dY, ds/dZ\}$, where X, Y and Z correspond to eye coordinates. That is, the derivative $\{ds/dX, ds/dY, ds/dZ\}$ corresponds to texture coordinate gradient vector $G_s$. The texture coordinate gradient vector, $G_t$, associated with the t texture coordinate is defined as the vector: $\{ds/dX, ds/dY, ds/dZ\}$. The $G_t$ texture coordinate gradient vector is calculated in order to determine which direction is "up" in the local coordinate system.

The preferred manner in which these gradient vectors are calculated will now be described with reference to pseudo code. It should be noted that the gradient calculations are generally performed prior to performing the PTM texture mapping algorithm of the present invention (e.g., see Step 1 of the above rendering process).

In the gradient calculations represented by the pseudo code below, $XYZ_0$ represented the (x,y,z) coordinates associated with vertex 0. Similarly, $XYZ_1$ and $XYZ_2$ represent the (x,y,z) coordinates associated with vertices 1 and 2, respectively. $ST_0$ represents the (s, t) texture coordinates associated with vertex 0. $ST_1$ and $ST_2$ represent the (s, t) texture coordinates associated with the vertices 1 and 2, respectively.

Calculation of the Texture Coordinate Gradient Vectors $G_s$ represents the texture coordinate gradient vector for the s texture coordinates $G_t$ represents the texture coordinate gradient vector for the t texture coordinates $XYZ_0$ $XYZ_1$ these are the (x, y, z) vertex positions $XYZ_2$ $ST_0$ $ST_1$ these are the (s, t) vertex texture positions $ST_2$ $D_1$ is the vector from vertex 0 to vertex 1

$D_2$ is the vector from vertex 0 to vertex 2

$T_1$ is the texture coordinate delta from vertex 0 to vertex 1

$T_2$ is the texture coordinate delta from vertex 0 to vertex 2

$W_{00}$ is the dot product of D with itself $W_{01}$ is the dot product of $D_1$ and $D_2$ $W_{11}$ is the dot product of $D_2$ with itself $D_1 = XYZ_1 - XYZ_0$ $D_2 = XYZ_2 - XYZ_0$ $T_1 = ST_1 - ST_0$ $T_2 = ST_2 - ST_0$ $W_{00} = D_1 \cdot D_1$ $W_{01} = D_1 \cdot D_2$ $W_{11} = D_2 \cdot D_2$ $\text{Denom} = 1/(W_{00} * W_{11} - W_{01} * W_{01})$ $p_s = (T_1 s * W_{11} + T_2 s * W_{01}) * \text{denom}$ $q_s = (T_2 s * W_{00} + T_1 s * W_{01}) * \text{denom}$ $G_s = p_s * D_1 + q_s * D_2$ $p_t = (T_1 t * W_{11} + T_2 t * W_{01}) * \text{denom}$ $q_t = (T_2 t * W_{00} + T_1 t * W_{01}) * \text{denom}$ $G_t = p_t * D_1 + q_t * D_2$ It should be recognized that the above calculations may be utilized to efficiently compute texture coordinate gradient vectors $G_s$ and $G_t$. Further description of the above calculations used in computing texture coordinate gradient vectors is now provided, which details how the above calculations may be arrived at and how they increase the efficiency of the computation of texture coordinate texture coordinate gradient vectors $G_s$ and $G_t$. While the above computations and the below description refer to computing gradient vectors for triangles, it should be understood that such computation method may be utilized for computing texture coordinate gradient vectors for any graphics primitive.

For each triangle vertex, texture coordinates (s, t) and vertex location (x, y, z) are input to the texture coordinate gradient vector calculation. The values for the three vertices of a triangle are represented as:

first vertex: $(x_0, y_0, z_0)$ $(s_0, t_0)$;

second vertex: $(x_1, y_1, z_1)$ $(s_1, t_1)$; and third vertex: $(x_2, y_2, z_2)$ $(s_2, t_2)$.

The change in vertex location and texture coordinates is represented as:

$D_1 = (x_1, y_1, z_1) - (x_0, y_0, z_0)$ (i.e., the vector from vertex 0 to vertex 1), $U_1 = s_1 - s_0$ and $V_1 = t_1 - t_0$; and $D_2 = (x_2, y_2, z_2) - (x_0, y_0, z_0)$ (i.e., the vector from vertex 0 to vertex 2), $U_2 = s_2 - s_0$ and $V_2 = t_2 - t_0$. It should be recognized that $(U_1, V_1)$ corresponds to $T_1$ in the above computations, and $(U_2, V_2)$ corresponds to $T_2$ in the above computations.

A property of the gradient vector is that the dot product of the gradient vector and any other vector on the surface of a triangle will be the change in texture coordinates, such that:

$$\begin{vmatrix} D_{1X} & D_{1Y} & D_{1Z} \\ D_{2X} & D_{2Y} & D_{2Z} \end{vmatrix} \begin{vmatrix} A \\ B \\ C \end{vmatrix} = \begin{vmatrix} U_1 \\ U_2 \end{vmatrix}$$

In the above example, (A,B,C) is the gradient vector. This results in a system of two equations and three unknowns, which alone is not enough to calculate the gradient vector. The gradient vector can be represented as a linear combination of the two vectors $D_1$ and $D_2$. This is used to rewrite the above system of equations to result in a system of two equations and two unknowns (i.e., linear combination variables P and Q), as follows:

$$\begin{vmatrix} D_{1X} & D_{1Y} & D_{1Z} \\ D_{2X} & D_{2Y} & D_{2Z} \end{vmatrix} \left( P \begin{vmatrix} D_{1X} \\ D_{1Y} \\ D_{1Z} \end{vmatrix} + Q \begin{vmatrix} D_{2X} \\ D_{2Y} \\ D_{2Z} \end{vmatrix} \right) = \begin{vmatrix} U_1 \\ U_2 \end{vmatrix}$$

It should be understood that linear combination variables P and Q are calculated once to determine gradient vector $G_s$ and once to determine gradient vector $G_t$. Thus, P calculated for gradient vectors $G_s$ and $G_t$ results in $p_s$ and $P_t$, respectively, as used in the above computations, and $Q$ calculated for $G_s$ and $G_t$ results in $q_s$ and $q_t$, respectively, as used in the above computations.

The above equations may be rewritten as:

$$\begin{vmatrix} W_{00} & W_{01} \\ W_{10} & W_{11} \end{vmatrix} \begin{vmatrix} P \\ Q \end{vmatrix} = \begin{vmatrix} U_1 \\ U_2 \end{vmatrix}, \text{wherein:}$$

$W_{00} = (D_{1X}, D_{1Y}, D_{1Z}) dot (D_{1X}, D_{1Y}, D_{1Z})$;

$W_{01} = (D_{1X}, D_{1Y}, D_{1Z}) dot (D_{2X}, D_{2Y}, D_{2Z})$;

$W_{10} = (D_{2X}, D_{2Y}, D_{2Z}) dot (D_{1X}, D_{1Y}, D_{1Z})$; and $W_{11} = (D_{2X}, D_{2Y}, D_{2Z}) dot (D_{2X}, D_{2Y}, D_{2Z})$.

It should be recognized that: $W_{01}=W_{10}$. Therefore, it is unnecessary to calculate both $W_{01}$ and $W_{10}$ independently, but rather in embodiments of the present invention, the calculation for determining $W_{01}$ and $W_{10}$ may be performed once to save the amount of computation performed. Thus, the above results in a system of two equations and two unknowns P and Q, which may be solved for as follows:

$$P = \frac{(U_1 * W_{11} - U_2 * W_{01})}{(W_{00} * W_{11} - W_{01} * W_{10})}; \text{ and}$$

$$Q = \frac{(U_2 * W_{00} - U_1 * W_{10})}{(W_{00} * W_{11} - W_{01} * W_{10})}.$$

Once calculated, P and Q can be used to calculate the gradient vector (A,B,C). In the above equations for computing P and Q, it should be recognized that the denominators in each equation are the same. Also, two gradient vectors will need to be calculated. That is, one gradient vector is calculated using U (i.e., $G_s$) and one gradient vector is calculated using V (i.e., $G_t$). The denominators in the calculations of P and Q are independent of U and V and therefore need to be calculated only once. Thus, because the denominators are the same for both P and Q, they only need to be computed once in solving for P and Q. Additionally, because P and Q must be determined for both U and V and because the denominators used in the calculations of P and Q are independent of U and V, once such denominator is computed once, it may be used for both U and V.

As one of ordinary skill in the art will recognize, once the texture coordinate gradient vectors are computed, they are generally normalized before being used in subsequent calculations. Once computed (and normalized), the texture coordinate gradient vectors may be used in orienting a graphics primitive (e.g., triangle) within a coordinate system of a PTM in the manner described above.

Figure 5:
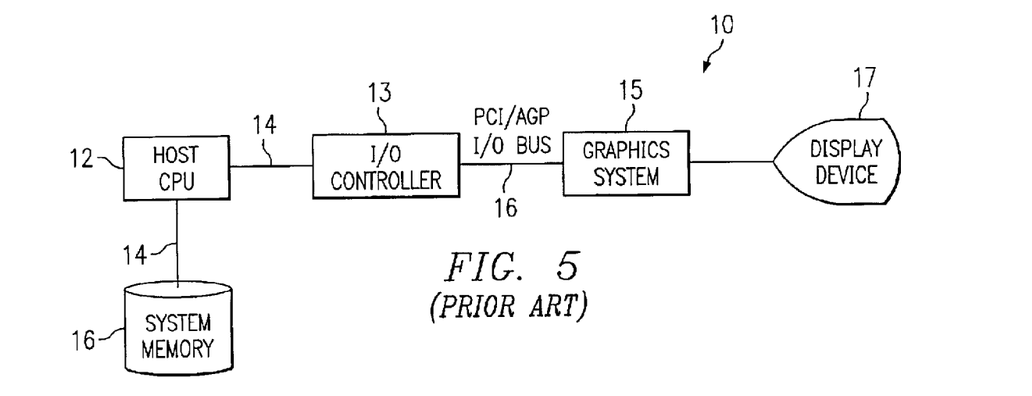
FIG. 5 illustrates a functional block diagram of a typical computer graphics display system.

Turning now to FIG. 5, an exemplary computer graphics display system 10 is shown, in which embodiments of the present invention may be implemented. The computer graphics display system 10 comprises a host CPU 12 connected to an input/output (I/O) controller 13, a graphics system 15, a system memory device 16 and a display device 17. The CPU 12 communicates with the system memory 16 and the I/O controller via a system bus 14. The graphics system 15 communicates with the I/O controller 13 via I/O bus 16. A user (not shown) may communicate with the CPU 12 via a peripheral input device, such as a keyboard or mouse, to generate and/or manipulate an image being rendered on the display device 17.

Figure 6:
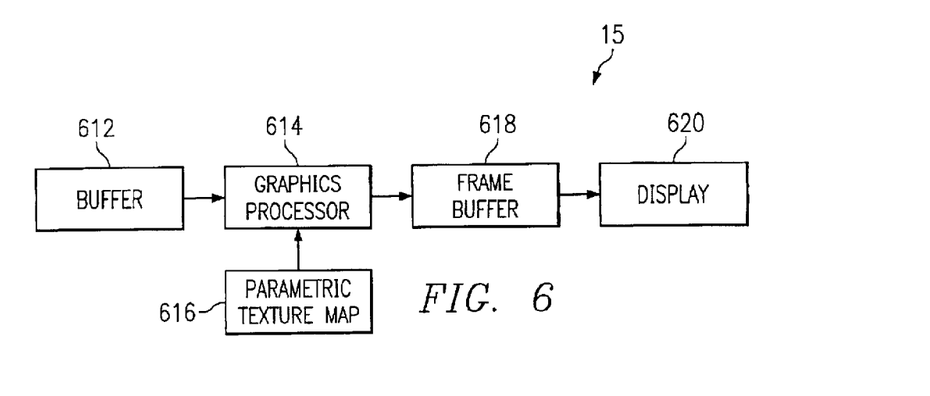
FIG. 6 depicts a block diagram of an exemplary graphics system 15 of FIG. 5 in which embodiments of the present invention may be implemented.

An example of components that may be included in graphics system 15 of the computer graphics display system 10 in accordance with embodiments of the present invention are further shown in FIG. 6. Graphics system 15 includes buffer 612, graphics processor 614, parametric texture map 616, frame buffer 618, and display 620, Buffer 612 holds geometry data that describes a 3D object which is to be generated on the display 620. Buffer 612 may be any suitable data storage mechanism now known or later discovered, including as examples Random Access Memory (RAM), cache memory, disk drive, floppy disk, and optical disc. The 3D object is represented in the buffer 612 as a set of polygons in a 3D space. In one embodiment, the polygons are triangles and the geometry data in buffer 612 includes the 3D coordinates of the vertices of the triangles.

Graphics system 15 includes graphics processor 614, which may be any suitable processor now known or later discovered, including without limitation any processor from the Itanium™ family of processors or a PA-8500 processor available from Hewlett-Packard Company. Graphics processor 614 reads the parameters that define the polygons from buffer 612 and scan converts each polygon. The scan conversion of a polygon yields a 2D view of the polygon which depends on a view direction and light source direction. A 2D view of a polygon includes a color value for each pixel of the polygon which is visible in the plane of display 620. Graphics processor 614 writes the color values for the rendered polygons into frame buffer 618. Frame buffer 614 may be any suitable data storage mechanism, including as examples RAM, cache memory, and disk drive. The color values from frame buffer 618 may be provided to display 620 on a frame by frame basis. Display 620 may be any conventional 2D display device now known or later discovered, such as a scan device or flat-panel display device, as examples.

Parametric texture map 616 may hold parameters that define a surface structure in a manner in which the appearance of the surface structure varies with any user-defined vector, such as the view vector, the light source vector, or the half-angle vector. In general, the half-angle vector is a vector that is halfway between the view and light source vectors. Graphics processor 614 maps the surface structure defined in parametric texture map 616 onto the polygons obtained from buffer 612 during scan conversion. The result is a more realistic rendering of 3D features in a surface on a 3D object in comparison to many other texture mapping techniques.

In view of the above, preferred embodiments of the present invention provide a system and method for efficiently rendering graphical images using PTMs by utilizing an efficient method for calculating texture coordinate gradient vectors. As described above, PTMs provide advantages over many other texture mapping techniques, and therefore it is desirable to use PTMs for rendering graphical images (e.g., for mapping textures onto a graphical object). As with other texture mapping techniques, PTMs utilize a 3D coordinate frame that is oriented with texture coordinate gradient vectors. Accordingly, preferred embodiments of the present invention provide a system and method that further improve the efficiency of PTMs by efficiently computing such texture coordinate gradient vectors used within PTMs.

In alternative embodiments, the above-described system and method for efficiently computing texture coordinate gradient vectors may be used with any texture mapping technique in which the resulting texture varies with changes in its orientation relative to a light vector, such as well known bump mapping techniques. For instance, the method of efficiently computing texture coordinate gradient vectors in accordance with the present invention may be used with bump mapping, as described further in U.S. patent application Ser. No. 09/573,059 entitled "METHOD AND APPA- RATUS FOR PERFORMING H-SPACE BUMP MAPPING SUITABLE FOR IMPLEMENTATION WITH H-SPACE LIGHTING IN A GRAPHICS PIPELINE OF A COMPUTER GRAPHICS DISPLAY SYSTEM" from which this application is a continuation-in-part.

What is claimed is:

1. A method for rendering a three-dimensional (3D) graphical image, said method comprising the steps of:
    representing said 3D graphical image as a plurality of graphics primitives each having a plurality of vertices;
    for each of said plurality of graphics primitives, computing at least two texture coordinate gradient vectors, wherein said computing comprises computing a first dot product ($W_{00}$) of a first vector ($D_1$) with itself;
    for each vertex of said plurality of graphics primitives, determining a 3D coordinate frame, wherein said determining step includes using said at least two texture coordinate gradient vectors computed for the respective graphics primitive for orienting said 3D coordinate frame; and
    utilizing at least said 3D coordinate frame to determine parameters of a parametric texture mapping function.

2. The method of claim 1 further comprising the step of:
    evaluating said parametric texture mapping function for rendering said 3D graphical image.

3. The method of claim 2 wherein said parametric texture mapping function comprises a biquadric polynomial having at least six coefficients.

4. The method of claim 1 wherein said step of utilizing comprises:
    calculating scalar components for said parametric texture mapping function.

5. The method of claim 4 wherein said scalar components include lighting scalar components.

6. The method of claim 1 wherein said 3D coordinate frame is formed by a normal vector, tangent vector, and binormal vector.

7. The method of claim 6 wherein said step of utilizing further comprises:
    calculating a first lighting scalar component for said parametric texture mapping function as the dot product of a light vector and said tangent vector; and
    calculating a second lighting scalar component for said parametric texture mapping function as the dot product of said light vector and said binormal vector.

8. The method of claim 1 wherein said step of computing at least two texture coordinate gradient vectors comprises:
    computing a first texture coordinate gradient vector that identifies the direction of maximum change along a first texture coordinate; and
    computing a second texture coordinate gradient vector that identifies the direction of maximum change along a second texture coordinate.

9. The method of claim 1 wherein said step of computing at least two texture coordinate gradient vectors comprises:
    assigning a computed value to a variable; and
    utilizing said variable in computing each of said at least two texture coordinate gradient vectors.

10. The method of claim 9 wherein said utilizing step further comprises:
    using said variable as a denominator in calculating linear combination variables that are used in further computing said at least two texture coordinate gradient vectors.

11. The method of claim 1 wherein said parametric texture mapping function is a luminance parametric texture mapping function.

12. The method of claim 1 wherein said parametric texture mapping function is a red-green-blue (RGB) parametric texture mapping function.

13. The method of claim 1 wherein said graphics primitive comprises a polygon.

14. The method of claim 1 wherein said parametric texture mapping (PTM) function comprises biquadric function $PTM(s,t,l_u,l_v) = A(s,t)l_u^2 + B(s,t)l_v^2 + C(s,t)l_u l_v + D(s,t)l_u + E(s,t)l_v + F(s,t)$, where s and t are texture coordinates, lu and lv are independent variables representing light direction, and A, B, C, D, E, and F are coefficients.

15. The method of claim 1 wherein said parametric texture mapping (PTM) function comprises biquadric function $PTM(v_u,v_v,l_u,l_v) = A(v_u,v_v)l_u^2 + B(v_u,v_v)l_v^2 + C(v_u,v_v)l_u l_v + D(v_u,v_v)l_u + E(v_u,v_v)l_v + F(v_u,v_v)$ where $v_u$ and $v_v$ are components of a view vector representing view direction, lu and lv are components of a light vector representing light direction, and A, B, C, D, E, and F are coefficients.

16. The method of claim 1 wherein said parametric texture mapping (PTM) function comprises biquadric function $PTM(h_u,h_v,d_u,d_v) = A(h_u,h_v)d_u^2 + B(h_u,h_v)d_v^2 + C(h_u,h_v)d_u d_v + D(h_u,h_v)d_u + E(h_u,h_v)d_v + F(h_u,h_v)$ where $h_u$ and $h_v$ are components of a half-angle vector, du and dv are components of a difference vector, and A, B, C, D, E, and F are coefficients.

17. The method of claim 1 wherein $D_1$ is a vector from a first of the plurality of vertices of the graphics primitive for which the at least two texture coordinate gradient vectors is being computed to a second of the plurality of vertices of the graphics primitive, and wherein said computing at least two texture coordinate gradient vectors further comprises:
    computing a second dot product ($W_{01}$) of a second vector ($D_2$) with $D_1$, wherein $D_2$ is a vector from the first of the plurality of vertices of the graphics primitive for which the at least two texture coordinate gradient vectors is being computed to a third of the plurality of vertices of the graphics primitive;
    computing a third dot product ($W_{11}$) of $D_2$ with itself;
    assigning to a variable a value computed based at least in part on $W_{00}$, $W_{01}$, and $W_{11}$; and
    utilizing said variable as a denominator in calculating linear combination variables that are used in further computing said at least two texture coordinate gradient vectors.

18. The method of claim 17 wherein said assigning to a variable a value computed based at least in part on $W_{00}$, $W_{01}$, and $W_{11}$ comprises:
    assigning said variable a value computed as a result of $1/(W_{00}*W_{11} - W_{01}*W_{01})$.

19. A method for mapping a computer graphics texture to a three-dimensional (3D) object, said method comprising the steps of:
    representing said 3D object as a plurality of graphics primitives;
    determining a first vector from a first vertex of a graphics primitive to a second vertex of said graphics primitive;
    determining a second vector from said first vertex to a third vertex of said graphics primitive;
    calculating a first dot product of said first vector by said first vector;
    calculating a second dot product of said first vector and said second vector;
    assigning one variable a value derived from at least said first dot product and said second dot product;
    computing at least two texture coordinate gradient vectors utilizing at least said one variable, wherein said at least two texture coordinate gradient vectors are indicative of orientation of a texture mapped to said graphics primitive;

determining a 3D coordinate frame for each vertex of said graphics primitive, wherein said determining comprises using said at least two texture coordinate gradient vectors for orienting said 3D coordinate frame; and utilizing at least said 3D coordinate frame in mapping said texture to said 3D object.

20. The method of claim 19 wherein said mapping said texture to said 3D object comprises utilizing a parametric texture map function.

21. A system for rendering three-dimensional (3D) graphical images, said system comprising:

data structure, stored to computer-readable media, representing said 3D graphical image as a plurality of graphics primitives each having a plurality of vertices;

software code, stored to computer-readable media, executable to compute at least two texture coordinate gradient vectors for each of said plurality of graphics primitives;

software code, stored to computer-readable media, executable to determine a 3D coordinate frame for each vertex of said plurality of graphics primitives, wherein said software code uses said at least two texture coordinate gradient vectors computed for the respective graphics primitive for orienting said 3D coordinate frame; and software code, stored to computer-readable media, executable to utilize at least said 3D coordinate frame to determine parameters of a parametric texture mapping function.

22. The system of claim 21 wherein said software code executable to compute at least two texture coordinate gradient vectors further comprises:

software code executable to assign a computed value to a variable; and software code executable to utilize said variable in computing each of aid at least two texture coordinate gradient vectors.

23. The system of claim 21 wherein said software code executable to compute at least two texture coordinate gradient vectors further comprises:

software code executable to use said variable as a denominator in calculating linear combination variables that are used in further computing said at least two texture coordinate gradient vectors.

24. The system of claim 21 wherein said 3D coordinate frame is formed by a normal vector, tangent vector, and binormal vector.

25. The system of claim 24 wherein said software code executable to determine a 3D coordinate frame further comprises:

software code executable to calculate a first lighting scalar component for said parametric texture mapping function as the dot product of a light vector and said tangent vector; and software code executable to calculate a second lighting scalar component for said parametric texture mapping function as the dot product of said light vector and said binormal vector.

26. A method for rendering a digital image of an object comprising:

using a plurality of graphics primitives to represent the object, wherein each of the graphics primitives has a plurality of vertices;

for each of the graphics primitives of the digital image, determining
(a) a gradient vector ($G_s$) that identifies the direction of maximum change in a first texture coordinate (s), and
(b) a gradient vector ($G_t$) that identifies the direction of maximum change in a second texture coordinate (t);

determining, for each vertex of at least one of the graphics primitives, a 3D coordinate frame formed by a surface normal vector, tangent vector, and binormal vector, where the tangent vector is determined as directed in the general direction of the s texture coordinate gradient vector ($G_s$) determined for the at least one graphics primitive and where the binormal vector is determined as directed in the general direction of the t texture coordinate gradient vector ($G_t$) determined for the at least one graphics primitive;

using the determined 3D coordinate frame of said at least one graphics primitive for solving a parametric texture mapping (PTM) function for each pixel of the corresponding graphics primitive.

27. The method of claim 26 comprising:

determining, for each vertex of each of the graphics primitives, a 3D coordinate frame formed by a surface normal vector, tangent vector, and binormal vector, where the tangent vector is determined as directed in the general direction of the s texture coordinate gradient vector ($G_s$) determined for the corresponding graphics primitive and where the binormal vector is determined as directed in the general direction of the t texture coordinate gradient vector ($G_t$) determined for the corresponding graphics primitive.

28. The method of claim 26 where the t texture coordinate is orthogonal to the s texture coordinate.

29. The method of claim 26 where said PTM function comprises biquadric function $PTM(s,t,l_u,l_v)=A(s,t)l_u^2+B(s,t)l_v^2+C(s,t)l_u l_v+D(s,t)l_u+E(s,t)l_v+F(s,t)$, where s and t are texture coordinates, lu and lv are independent variables representing light direction, and A, B, C, D, E, and F are coefficients.

30. A method for rendering a three-dimensional (3D) graphical image, said method comprising:

representing said 3D graphical image as a plurality of graphics primitives each having a plurality of vertices;

for each of said plurality of graphics primitives, computing at least two texture coordinate gradient vectors, wherein said computing comprises computing a dot product of a first vector with itself;

for each vertex of said plurality of graphics primitives, determining a 3D coordinate frame, wherein said determining step includes using said at least two texture coordinate gradient vectors computed for the respective graphics primitive for orienting said 3D coordinate frame; and utilizing at least said 3D coordinate frame to determine parameters of a parametric texture map (PTM) that includes a biquadric function having at least four independent variables, where a first two of said four independent variables are for indexing the PTM and the other two of said four independent variables are for evaluating the PTM function.

31. The method of claim 30 wherein the four independent variables comprise s, t, $l_u$, and $l_v$, where s and t are texture coordinates and $l_u$ and $l_v$ are components of a light vector representing light direction.

32. The method of claim 30 wherein the four independent variables comprise $l_u$, $l_v$, $v_u$, and $v_v$, where $l_u$ and $l_v$ are components of a light vector representing light direction and where $v_u$ and $v_v$ are components of a view vector representing view direction.

33. The method of claim 30 wherein the four independent variables comprise $h_u$, $h_v$, $d_u$, and $d_v$, where $h_u$ and $h_v$ are components of a half-angle vector and where du and dv are components of a difference vector.

34. The method of claim 30 wherein said first vector is a vector from one of the plurality of vertices of the graphics primitive for which the at least two texture coordinate gradient vectors are being computed to another of the plurality of vertices of the graphics primitive for which the at least two texture coordinate gradient vectors are being computed.

35. A method comprising:

using a plurality of graphics primitives to represent the object, wherein each of the graphics primitives has a plurality of vertices, where at least one of the graphics primitives has a first vertex position ($XYZ_0$), a second vertex position ($XYZ_1$), and a third vertex position ($XYZ_2$);

associating texture coordinates of a texture map with each of the vertices of the at least one graphics primitives, where texture coordinates $ST_0$, $ST_1$, and $ST_2$ are associated with vertices $XYZ_0$, $XYZ_1$, and $XYZ_2$, respectively;

determine a first vector ($D_1$) from the first vertex position ($XYZ_0$) to the second vertex position ($XYZ_1$);

determine a second vector ($D_2$) from the first vertex position ($XYZ_0$) to the third vertex position ($XYZ_2$);

determine $T_1 = ST_1 - ST_0$;

determine $T_2 = ST_2 - ST_0$;

compute first dot product ($W_{00}$) of first vector ($D_1$) with itself ($W_{00} = D_1 \cdot D_1$);

compute second dot product ($W_{01}$) of first vector ($D_1$) with second vector ($D_2$) ($W_{01} = D_1 \cdot D_2$);

compute third dot product ($W_{11}$) of second vector ($D_2$) with itself ($W_{11} = D_2 \cdot D_2$);

compute denom=$1/(W_{00}*W_{11} - W_{01}*W_{01})$;

compute $p_s = (T_1 s * W_{11} + T_2 s * W_{01}) *$ denom;

compute $q_s = (T_2 s * W_{00} + T_1 S * W_{01}) *$ denom;

determine a first gradient vector ($G_s$) that identifies the direction of maximum change in a first texture coordinate (s) as $G_s = p_s * D_1 + q_s * D_2$;

compute $p_t = (T_1 t * W_{11} + T_2 t * W_{01}) *$ denom;

compute $q_t = (T_2 t * W_{00} + T_1 t * W_{01}) *$ denom; and determine a second gradient vector ($G_t$) that identifies the direction of maximum change in a second texture coordinate (t) as $G_t = p_t * D_1 + q_t * D_2$.

36. The method of claim 35 further comprising:

determining, for each vertex of the at least one of the graphics primitives, a 3D coordinate frame formed by a surface normal vector, tangent vector, and binomial vector, where the tangent vector is determined as directed in the general direction of the s texture coordinate gradient vector ($G_s$) determined for the at least one graphics primitive and where the binomial vector is determined as directed in the general direction of the t texture coordinate gradient vector ($G_t$) determined for the at least one graphics primitive.

* * * * *